United States Patent [19]

Gray et al.

[11] E Re. 30,689

[45] Reissued Jul. 28, 1981

[54] FOLDABLE BENCH FOR A PORTABLE HAND-HELD CIRCULAR SAW

[76] Inventors: Edward L. Gray, Rte. 7, Gray Bluff Trail, Chapel Hill, N.C. 25714; Bruce E. Browning, Jr., P.O. Box 56, Carrboro, N.C. 27510

[21] Appl. No.: 113,033

[22] Filed: Jan. 17, 1980

Related U.S. Patent Documents

Reissue of:

[64] Patent No.: 4,068,550
Issued: Jan. 17, 1978
Appl. No.: 723,475
Filed: Sep. 14, 1976

[51] Int. Cl.[3] ..... B27B 5/18

[52] U.S. Cl. ..... 83/471.2; 83/477.2; 83/488; 83/487; 144/286 R

[58] Field of Search ..... 83/471.2, 477.2, 485, 83/487, 488, 438, 574; 144/285, 286 R

[56] References Cited

U.S. PATENT DOCUMENTS

| | | | |
|---|---|---|---|
| 1,411,805 | 4/1922 | Mueller | 144/286 R |
| 1,930,168 | 10/1930 | Hall | 83/471.2 |
| 2,166,703 | 7/1939 | Boice | 83/438 |
| 2,412,395 | 12/1946 | Goosmann | 144/286 R |
| 2,729,250 | 1/1956 | Gilkey | 83/477.2 |
| 2,956,597 | 10/1960 | Leitchner | 83/471.2 |

*Primary Examiner*—Donald R. Schran
*Attorney, Agent, or Firm*—Sixbey, Friedman & Leedom

[57] ABSTRACT

A foldable bench for converting a normally hand-held electrically powered circular saw into a table saw, wherein the bench is easily portable when folded and highly stable when in use. In particular, the bench employs four foldable leg members having floor engaging extremities movable from a first position wherein the leg members are contained entirely within the bench housing to a second position wherein the floor engaging extremities are positioned laterally beyond the lateral extremities of the upper surface of the bench to thereby provide a compact, portable unit when the leg members are folded and an extremely stable bench when the leg members are extended. Simplicity in design is achieved by extrusion forming the upper surface from a single unitary member having means for slidingly mounting the portable hand-held circular saw and containing side grooves for receiving auxiliary attachment fasteners. The foldable bench is further characterized by the provision of a unique hinge structure permitting the leg members to be retained in the highly stable laterally extended position and to be foldable into a position wherein the leg members are contained entirely within the bench housing.

21 Claims, 16 Drawing Figures

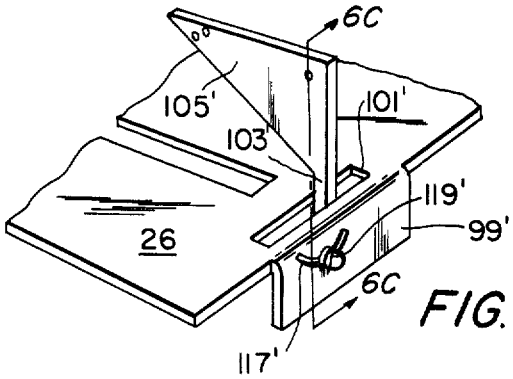
FIG. 6B
FIG. 6C
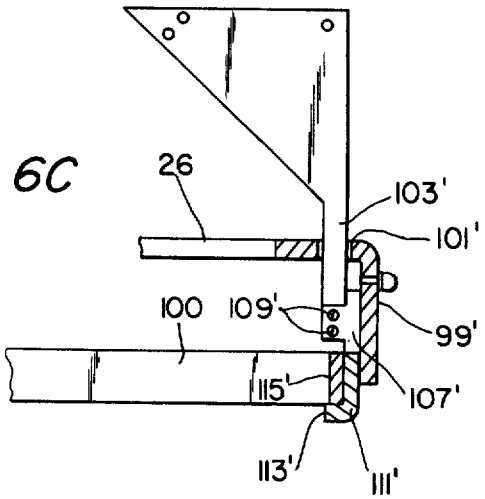
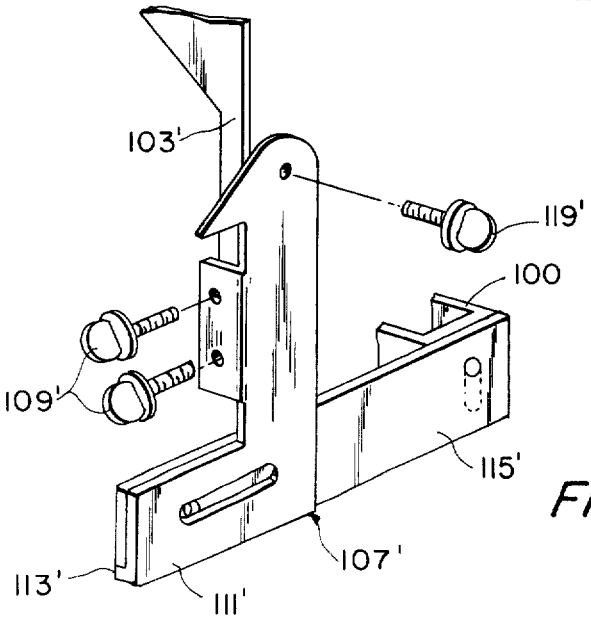
FIG. 6D

FOLDABLE BENCH FOR A PORTABLE HAND-HELD CIRCULAR SAW

Matter enclosed in heavy brackets [ ] appears in the original patent but forms no part of this reissue specification; matter printed in italics indicates the additions made by reissue.

BACKGROUND

1. Field of Invention

This invention relates generally to the field of portable apparatus adapted to convert a normally hand-held, electrically powered circular saw into a table or bench saw.

2. Description of the Prior Art

It has long been a desire in the building trades industry to have a practical, portable device for adapting the common electrically powered hand-held circular saw for use as a table saw. Exemplary of early attempts to achieve this goal is the device described in U.S. Pat. No. 2,786,500 to Unterfranz wherein a carrying case for a portable hand saw serves to mount the saw for use as a table saw. While useful for certain simple types of cuts, the device disclosed in the Unterfranz patent fails to provide many of the features normally considered essential to the practical operation of a table saw. For example, the Unterfranz device required movement of the workpiece over the upper support surface of the table saw which may result in an inaccurate cut or damage to the saw. The small size of the upper work space (necessitated by the need to keep the carrying case relatively small) normally employed in devices such as illustrated in the Unterfranz patent may even result in injury to the operator should attempts to move a large or awkward workpiece result in "kick-back" of the workpiece by the saw blade.

In an attempt to solve the inadequacies of devices such as illustrated in the Unterfranz patent, efforts have been made to design a more practical table for portable hand saws such as disclosed in U.S. Pat. No. 2,956,597 to Leitchner. While the Leitchner apparatus solves some of the drawbacks associated with the Unterfranz type designs by employing structure permitting the saw to be moved beneath the upper support surface to avoid the necessity of moving the workpiece, substantial sacrifices in the form of increased cost and complexity of manufacture and maintenance had to be made in order to achieve this result. In particular, the Leitchner device attempts to provide greater accessibility and added support for large, awkward workpieces by use of leg supports and by means of an add on upper support surface extension. While desirable, these added features require the use of six separate leg supports, two of which require height adjusting means in order to accommodate varying floor level. Accordingly, a need has long existed for a portable bench design for converting a hand held electrically powered circular saw for use as a table saw wherein the bench is inexpensive and easily portable and yet is capable of performing all of the tasks normally performed by table saws having slidingly supported circular saws.

SUMMARY OF THE INVENTION

It is an object of this invention to provide a foldable, portable bench overcoming the above-noted deficiencies of the prior art by providing an extremely compact, portable structure when folded and an extremely stable and accessible structure when fully erected. Furthermore, the foldable bench of the subject invention is designed to provide these benefits while also utilizing an extremely simple and economical form capable of performing most of the functions attributed to prior art portable benches without the disadvantages normally attributed thereto. It is a more particular object of the subject invention to provide a portable bench having a housing for supporting a normally hand-held, electrically powered, circular saw wherein the housing includes an upper surface for supporting material in a position to be cut by the saw, a retractable support means for supporting the housing in a position above floor level such that the upper surface is easily accessible by an operator and a plurality of foldable leg members movable from a first position wherein the foldable leg members are contained entirely within the housing to a second position wherein the floor engaging extremities of the leg members are positioned laterally beyond the extremities of the upper surface. The provision of this folding leg member feature permits the foldable bench to be made extremely compact when the leg members are in the first position and extremely stable when in the second position.

It is a further object of this invention to provide a portable bench having the above-noted features and including first and second hinge means for hingedly connecting first and second pairs of the leg members respectively, to the housing to pivot about first and second axes, respectively, parallel to a pair of opposed sidewalls of the housing. Each hinge means includes a plate member hingedly connected to the lower extremity of one of the opposed sidewalls of the housing and includes a movable pivot means for constraining each of the associated pair of leg members to pivot about a pair of axes, respectively, perpendicular to the plane defined by the plate member. This movable pivot means permits each leg member to be moved from the second position, referred to above when the associated pivot axis is at a maximum lateral position with respect to the plate member to an intermediate position when the pivot axis is displaced inwardly from the lateral edges of the member. By providing movable pivot means, the intermediate positions of one pair of leg members associated with one plate member may be spaced from the lateral edges of the associated one plate member by a lateral distance which exceeds the laterally inwardly spaced intermediate positions, respectively, of the remaining pair of leg members associated with the other plate member. By making this greater lateral inward spacing of each member of one pair of leg members exceed the lateral width of each member of the pair of remaining leg members, all of the leg members may be pivoted about the axis defined by the hinge means to a position in which all leg members are arranged parallel to and entirely between a second air of opposed sidewalls of the housing. Since all of the leg members are parallel to only one pair of sidewalls, the foldable bench may have one lateral dimension considerably less than the length of any one leg member to form a very compact and foldable bench.

It is yet another object of the subject invention to provide a portable bench as described above wherein the upper surface contains a longitudinally extending slot and further wherein the bench includes a sliding plate to which the base of an electrically powered, circular saw may be removably mounted such that the circular saw blade extends upwardly through and is slidable within the longitudinally extending slot.

It is still another object of the subject invention to provide a foldable bench wherein the housing includes an extruded top member formed as a unitary element to include an upper surface support means for supporting the sliding plate referred to above and including side grooves to receive fasteners of auxiliary equipment designed to be attached to the foldable bench.

A still further object of the subject invention is the provision of a saw guard assembly mounted to the sliding plate and including a guard base mounted beneath the sliding plate and extending above the sliding plate through the longitudinally extending slide of the upper surface combined with a circular saw guard movable between a first position fully enclosing that portion of a circular saw blade which extends above the support surface to a second position exposing the circular saw blade for cutting. The circular saw guard may include a workpiece, engaging surface for automatically displacing the circular saw guard from the first toward the second position as the circular saw blade is moved into engagement with a workpiece. A link member may be provided in the saw guard assembly which is pivotally connected at one end to the guard assembly base and pivotally connected at the other end to the circular saw guard in order to permit the saw guard to be moved upwardly in a generally parallel orientation with regard to the upper surface of the foldable bench.

Numerous additional objects of the invention may be ascertained from a consideration of the following description of the preferred embodiments.

DESCRIPTION OF THE PREFERRED EMBODIMENTS

Figure 1:
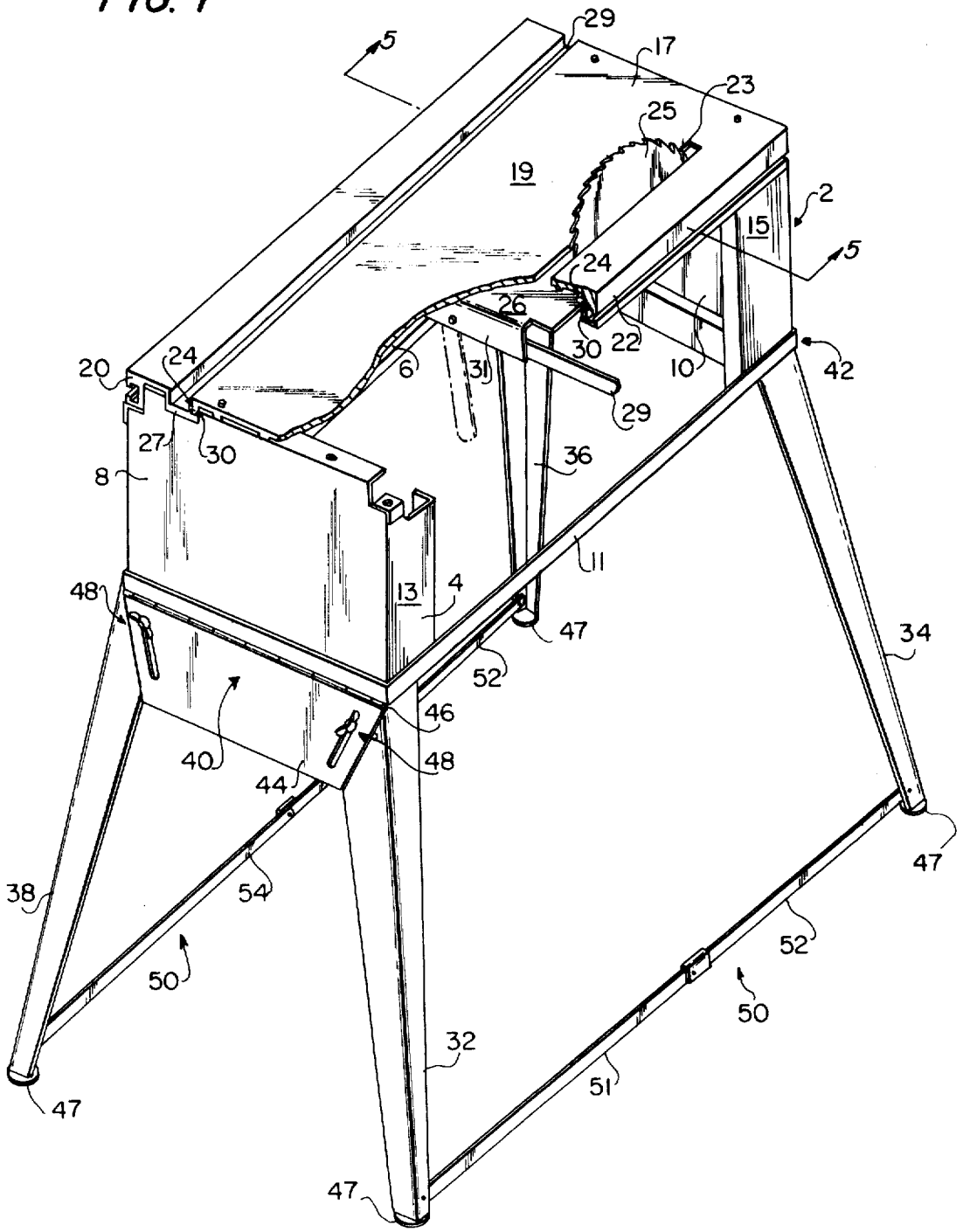
FIG. 1 is a cutaway perspective view of a foldable bench designed in accordance with the subject invention illustrated in a fully erected condition.

Referring initially to FIG. 1, a foldable bench designed in accordance with the subject invention is illustrated in partial cutaway perspective view wherein the bench is illustrated to include a housing 2 having a first opposed pair of sidewalls 4,6 and a second pair of opposed sidewalls 8,10. It should be noted that the first pair of opposed sidewalls 4,6 have a horizontal dimension greater than the second pair of sidewalls for reasons which will be explained more fully herein below.

The bench housing may be formed by providing a rectangular lower support extremity made of L-shaped channel iron 11. Opposed sidewalls 8, 10 may be formed of sheet metal integrally connected with sheet metal sections 13 and 15, respectively, forming sidewall 4 containing an open medial portion. Similar latent sections form the lateral side portion of sidewall 6 but are not illustrated in FIG. 1. Obviously sidewalls 8 and 10 may be formed simultaneously with the associated sections of sidewalls 4 and 6 and may be fastened to channel iron 11 to inexpensively form the lower portion of the bench housing 2.

The upper portion of the bench housing is formed of a single extruded top member 17 designed to include an upper surface 19 upon which workpieces may be supported during cutting operations. Also formed during the extrusion of member 17 are downwardly extending edge projections 20,22 along the lateral edges of member 17 adjacent opposed sidewalls 4 and 6. To obtain optimum strength while adding minimum weight, member 17 is preferably extruded from aluminum.

Member 17 further includes an elongated slot 23 parallel to adjacent edge projection 22 through which the blade 25 of a portable circular hand saw extends for longitudinal movement parallel to the edge projections. On the opposite side of the member 17 a third downward projection 27 is formed parallel and adjacent projection 20. This third projection 27 contains an upwardly opening square cross-sectional groove 29 adapted to receive and align a cross cut guide (not illustrated) for movement parallel to the plane defined by blade 25.

Projections 22 and 27 contain support means 24 for mounting a sliding plate 26 to which a standard hand-held electrically powered circular saw 28 (only the blade of which is visible in FIG. 1) may be attached. The support means 24 is formed by a pair of laterally inwardly opening grooves 30 contained within projections 22, 27, respectively, shaped to receive the lateral side edges of sliding plate 26 as will be discussed in more detail below. Pivotally connected to a downwardly extending lip 31 of plate 26 is a handle 29 illustrated as extending horizontally through the open medial portion of sidewall 4. When the bench is folded, handle 29 may be pivoted into the position illustrated in dashed lines so that the handle is contained entirely within the housing 2.

As illustrated in FIG. 1, the foldable bench includes four foldable leg members 32, 34, 36 and 38. Each leg member (which may be formed of sheet metal) includes a pair of intersecting, perpendicularly arranged, flat sides. Leg members 32 and 38 are connected to the lower extremity of sidewall 8 by hinge means 40, and leg members 34 and 36 are connected to the lower extremity of sidewall 10 by hinge means 42 (not illustrated in FIG. 1) identical to hinge means 40. Each hinge means 40 and 42 includes a trapezoidally shaped plate member 44 hingedly connected to the associated sidewall along the longer base of the trapezoid by means of a piano type hinge 46. Hinges 46 form first and second axes, respectively, parallel to sidewalls 8 and 10. The leg members and hinge means together form retractable support means for supporting the housing in a position above floor level such that the upper surface is easily accessible by an operator.

The retractable support means permits the floor engaging extremities 48 of the leg members to be moved from a first position wherein the leg members are contained entirely within the housing 2 to a second position wherein the floor engaging extremities 47 are positioned laterally beyond the lateral extremities of the upper surface of member 17 as illustrated in FIG. 1. By this arrangement the foldable bench may be made extremely compact when the foldable leg members are in the folded (first) position and extremely stable when the leg members are in the extended (second) position.

Connecting each leg member to the associated plate member is a pivot means 48 for constraining each of the associated pair of leg members to pivot about a pair of axes, respectively, perpendicular to the plane defined by the associated plate member. Each pivot means 48 is movable to permit displacement of the associated pivot axes from a maximum lateral position, as illustrated in FIG. 1, with respect to the plate members, to an intermediate position wherein the pivot axis is displaced inwardly as will be discussed in more detail below.

Brace means 50 extending between leg members 32 and 34 and between leg members 38 and 36 are provided to prevent lateral movement of the floor engaging extremities 47 beyond a predetermined point in an outward lateral direction from sidewalls 8 and 10. Each brace means 50 includes pivoted links 52 and 54 wherein link 52 is permanently pivotally connected to the associated leg member 34 or 36. Link 54 is removably connected with associated leg member 32 or 38.

Figure 2:
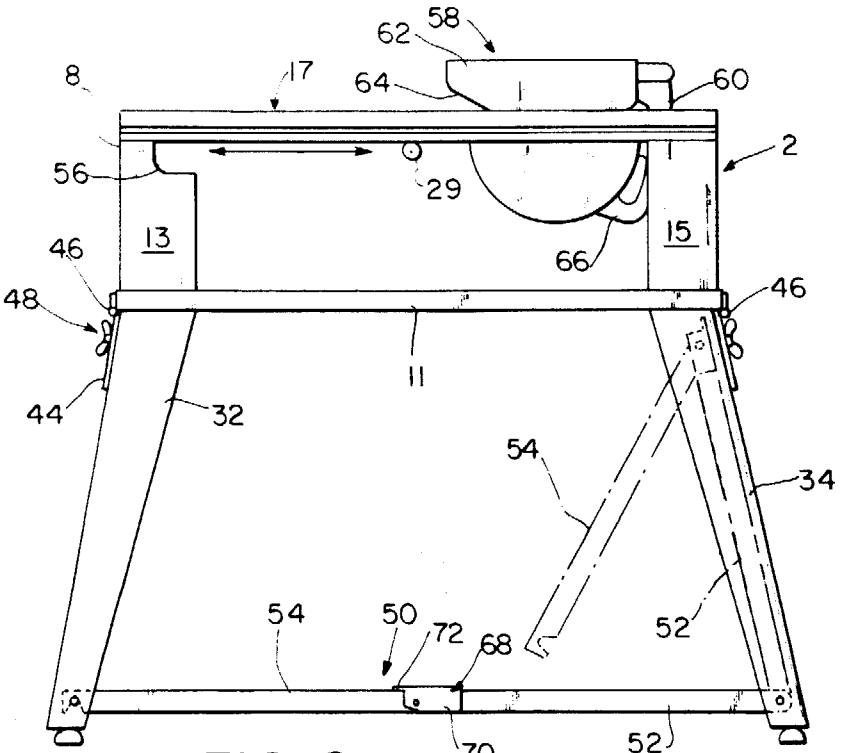
FIG. 2 is a side elevational view of a fully erected portable bench designed in accordance with the subject invention to which a hand-held circular saw and saw guard assembly have been attached.

Turning now to FIG. 2 the foldable bench of the subject invention is illustrated in a side elevational view when in a fully erected condition. Section 13 is notched out at 56 in order to permit handle 29 to be moved as far toward sidewall 8 as possible. FIG. 2 also illustrates a saw blade guard assembly 58 mounted to move with sliding plate 26. The saw blade guard assembly 58 may be connected directly to plate 26 by means of a base 60 which extends through slot 23. Pivotally connected to base 60 is a saw guard 62 having a workpiece engaging surface 64 which is adapted to cause the saw guard to pivot upwardly to expose the blade of the hand saw 66. Other types of saw guard assemblies may be used as will be discussed below.

The brace means 50 may include a pivot stop means 68 formed from a bracket 70 rigidly connected to link 52 and having a lip 72 extending horizontally when in use to contact link 54 and prevent further rotational movement of link 54 relative to link 52 beyond the longitudinal alignment illustrated in FIG. 2. Links 52 and 54 are illustrated in dashed lines in FIG. 2 in a position resulting when link 52 is rotated into a fully retracted position and link 54 is intermediate its fully extended and fully retracted positions.

Figure 3:
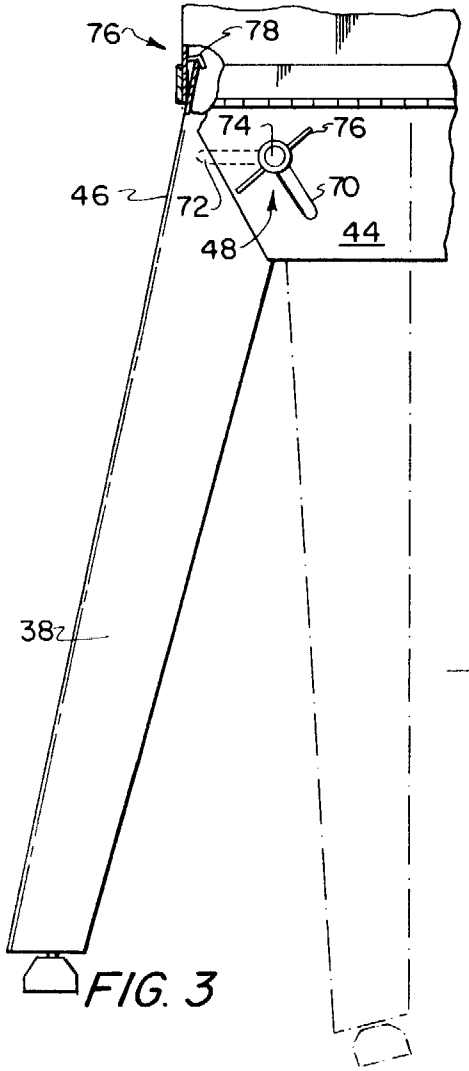
FIG. 3 is a partially broken away side elevational view of a leg member which has been moved from a fully extended first position in contact with a leg stabilizer illustrated in solid lines to an intermediate leg position illustrated in dashed lines.

FIG. 3 is a cutaway front elevational view of the foldable bench disclosing the intermediate position of leg member 38 (dashed lines) and the position (referred to above as the second position) of leg member 38 (illustrated in full lines) when the bench is fully erected. Pivot means 48 discussed above is illustrated as including the portion of plate member 44 containing a slot 70 extending inwardly from the adjacent lateral edge of plate member 44 as the slot extends away from hinge 46. Pivot means 48 also includes that portion of leg member 38 which contains a slot 72 intersecting with slot 70. Slot 72 extends generally horizontally and outwardly from the upper end of slot 70 when leg member 38 is in the second position as illustrated in full lines in FIG. 3. The pivot means further includes a releasable fastener means including a bolt 74 extending through the intersection of slots 70 and 72 and selectively secured by wing nut 76 in order to retain leg member 38 and plate member 44 in a fixed relative position. When wing nut 76 is loosened, leg member 38 may be moved inwardly along slot 72 and downwardly along slot 70 into the intermediate position illustrated in dashed lines in FIG. 3.

In order to provide increased stability and insure against collapse of the foldable bench, housing 2 is provided with stabilizer means 76 at each of the lower four corners of housing 2 for engaging the upper extremities of the leg members when in the second position in order to resist further outward movement of the floor engaging extremities of the leg members about the pivot axis formed by bolt 74 of pivot means 48. In particular, each stabilizer means 76 includes an L-shaped clip 78 connected to housing 2 and arranged to engage the upper edge of each leg member, respectively, in order to resist pivotal movement of the associated leg member about the respective pivot axis formed by the bolt of the associated pivot means.

Figure 3A:
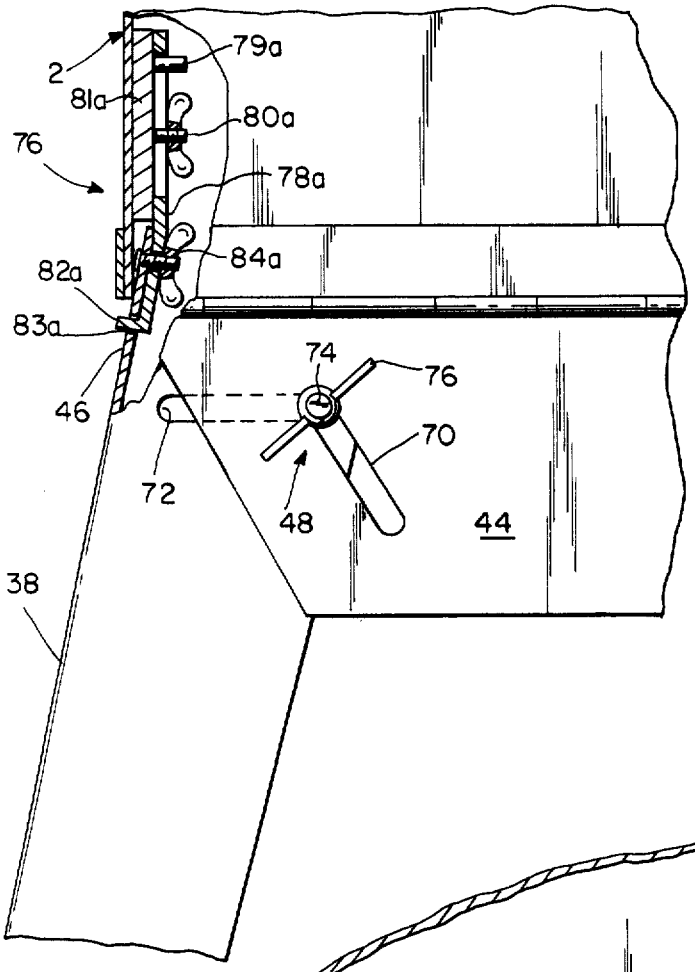
FIG. 3A is a broken away side elevational view of an alternative form of the leg stabilizer.
Figure 3B:
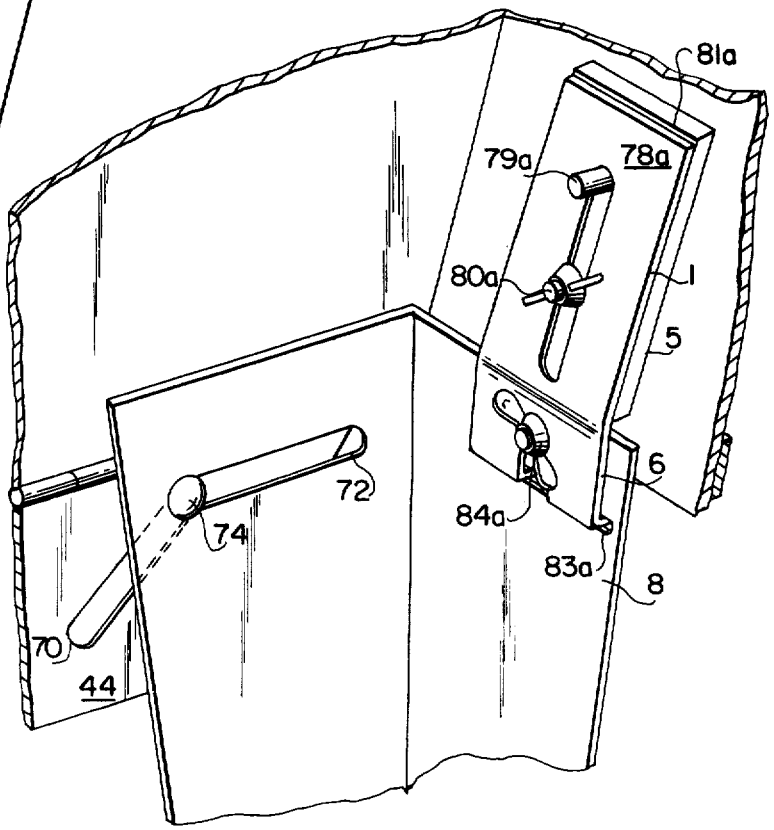
FIG. 3B is a perspective view of the leg stabilizer illustrated in FIG. 3A.

FIGS. 3A and 3B disclose an alternative form of the stabilizer wherein clip 78 has been replaced by a stabilizer bracket 78a connected via pin 79a and wing nut fastener 80a to a side wall of housing 2 by a stiffening block 81a. The lower end of bracket 78a is bent at an angle to conform with the plane defined by leg 38 when in the second position. The lower extremity of bracket 78a is bent to form a lip 82a for engagement with a slot 83a formed in leg 38. An additional wing nut fastener 84a connects the lower end of bracket 78a to leg 38. Obviously, wing nut fasteners 80a and 84a may be disengaged to permit folding of the legs.

If leg members 32 and 34 are considered to form a first pair of leg members and leg members 36 and 38 are considered to form a second pair of leg members, the following condition must hold in order for the leg members, when in the intermediate position, to be pivoted about the axes parallel to the opposed side walls 8 and 10: one leg member from each pair of leg members, when in the intermediate position, must be inwardly spaced from the adjacent lateral edge of the associated plate member 44 by a lateral distance which exceeds the sum of the lateral width and the laterally, inwardly-spaced intermediate position of the other leg member of each pair of leg members. This fact is illustrated in FIG.

Figure 4:
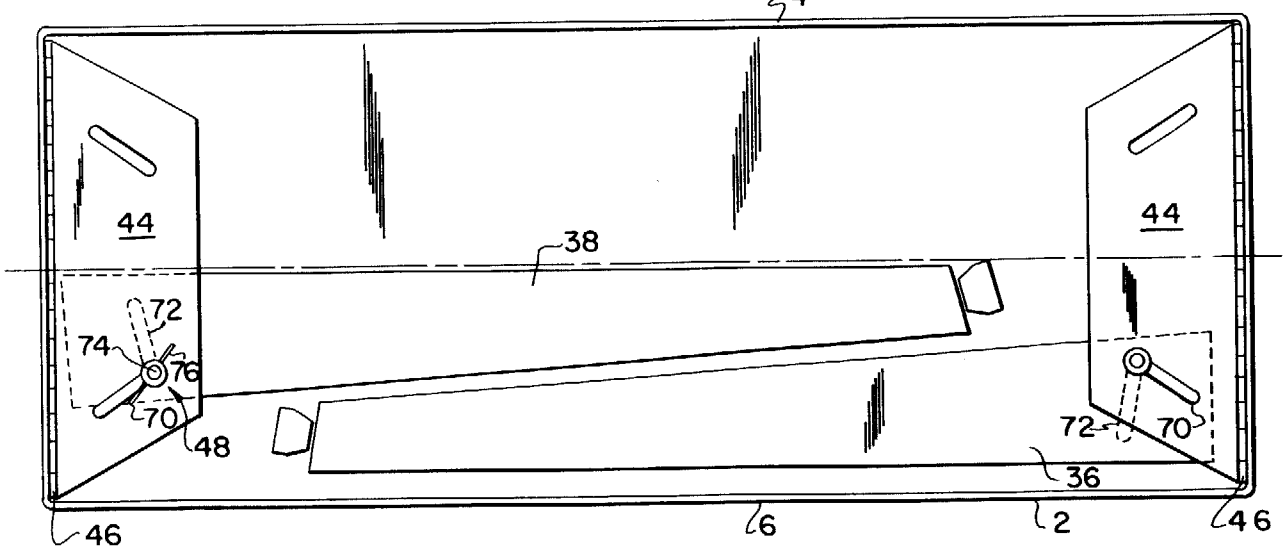
FIG. 4 is a bottom elevational view of the foldable bench illustrated in FIG. 2 wherein two of the leg members are illustrated in the fully folded position parallel to each other and parallel to the longer opposed pair of sidewalls of the bench housing.

4 wherein leg members 36 and 38 are disclosed in the folded first position generally parallel to each other and to opposed side walls 4 and 6. From FIG. 4, it is obvious that leg member 36 has been displaced downwardly along slot 70 away from hinge 46 but not inwardly along slot 72 while leg member 38 has been displaced not only downwardly along slot 70 but also inwardly along slot 72 in order to permit leg member 38 to be pivoted into a position parallel to leg member 36. Similarly, one of leg members 32 and 34 (not illustrated in FIG. 4) must be displaced inwardly by a distance which exceeds the sum of the lateral width and the laterally inwardly-spaced intermediate position of the other of leg members 32 and 34.

Figure 5:
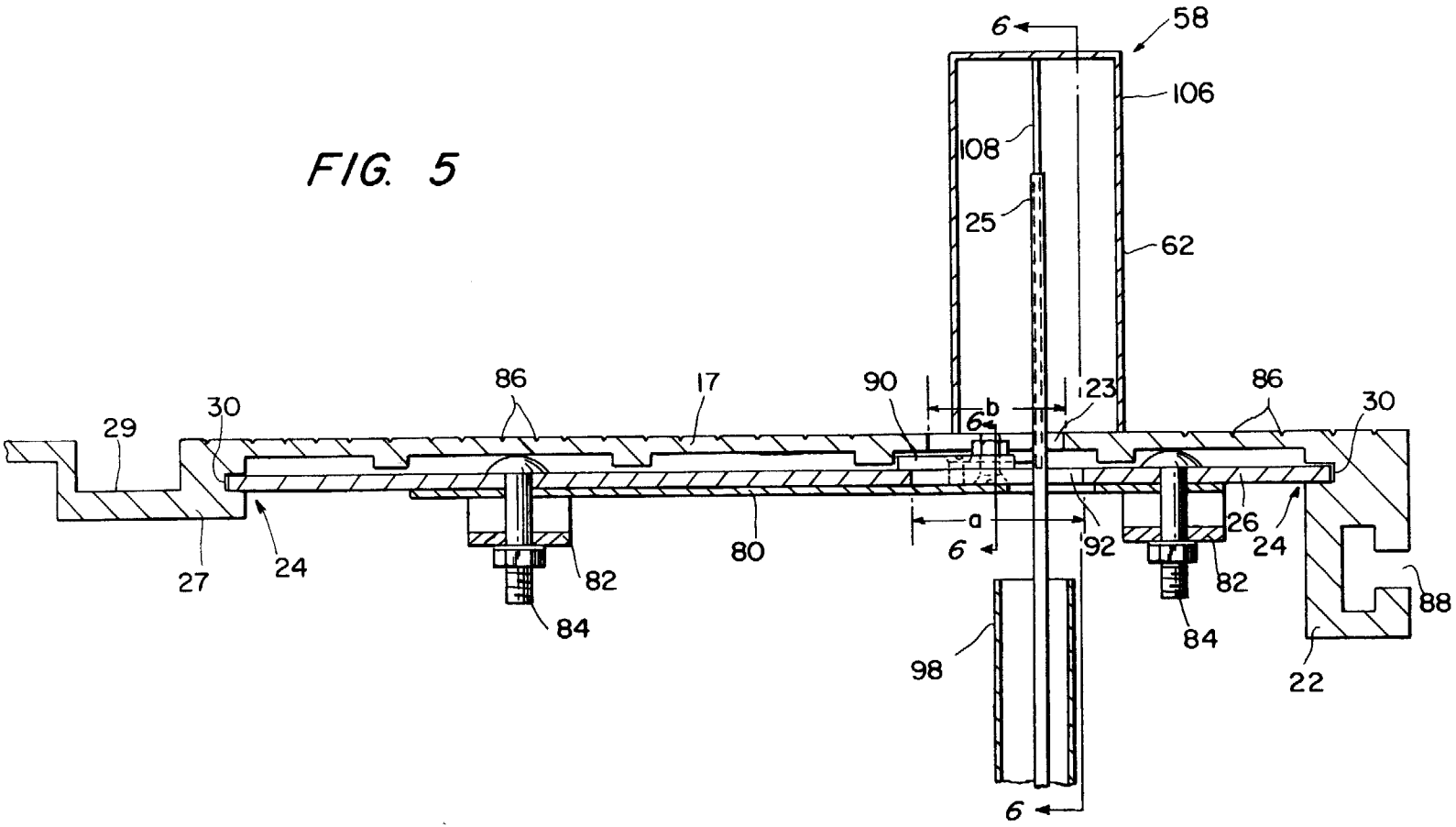
FIG. 5 is a cross-sectional view of the top member of the housing taken along lines 5—5 of FIG. 1 modified to include the saw guard assembly of FIG. 2.

Referring now to FIG. 5, the top member 17 is illustrated in more detail wherein the base plate 80 of a standard electrically powered, hand held, circular saw is illustrated as being removably connected to sliding plate 26 by means of U-shaped clips 82 and bolts 84 although other types of fasteners could be used. Also illustrated in FIG. 5 are small V-shaped grooves 86 extending over the top surface of member 17 parallel to the elongated slot 23 which grooves are adapted for assisting in the alignment of attachments as will be explained below. Projection 22 of the top member 17 contains an elongated "T" slot 88 opening laterally outwardly. Slot 88 is designed to receive the head of a fastener for connecting auxiliary attachments as will also be explained below.

A cover strip 90 for excluding saw dust may be connected to sliding plate 26 in order to partially cover elongated slot 92 contained in plate 26 through which blade 25 extends into slot 23 of top member 17 when blade 25 is arranged vertically. If blade 25 is arranged at a slant with respect to vertical, by means of the standard adjustment normally provided on hand-held circular saw relative to base plate 80 (not illustrated), cover strip 90 can be removed to provide the necessary clearance.

Figure 6:
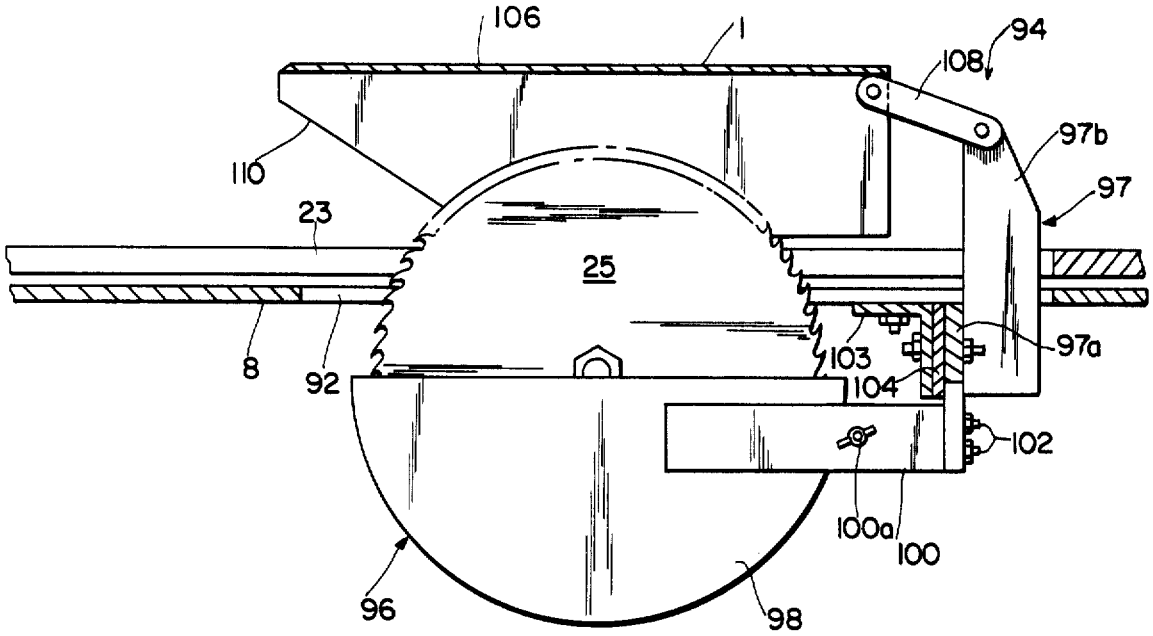
FIG. 6 is a cross sectional view of the sliding plate and saw guard assembly illustrated in FIG. 5 taken along lines 6—6.
Figure 6A:
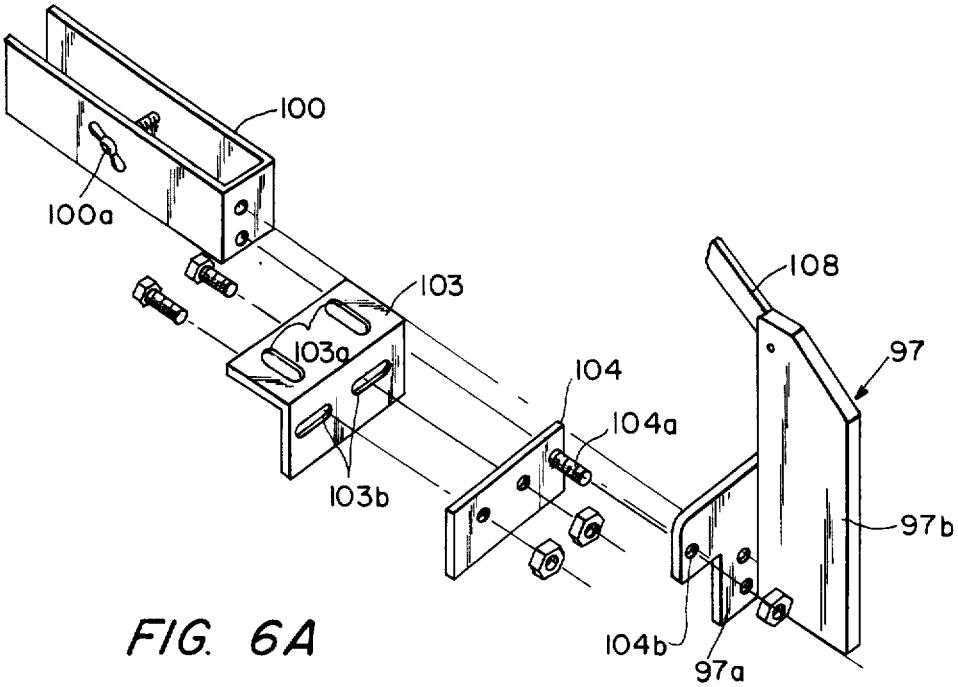
FIG. 6A is an exploded perspective view of the saw guard assembly base illustrated in FIG. 6, FIGS. 6B, 6C and 6D disclose an alternative saw guard assembly base.

FIG. 6 illustrates a cross-sectional view of sliding plate 26 taken along lines 6—6 of FIG. 5 wherein the preferred form of the guard assembly 94 is disclosed as it appears when connected with a standard hand-held circular saw 96 mounted on sliding plate 26. In particular, the guard assembly includes a base 97, having perpendicularly arranged sections 97a and 97b wherein section 97a is connected to the normally existing saw guard 98 of standard saw 96 by means of a U-shaped mounting bracket 100 mounted on section 97a by bolts 102. A wing nut and bolt 100a are arranged to cause the extremities of the legs of the U-shaped mounting bracket to grip saw guard 98. Base section 97b extends upwardly through slots 92 and 23 of sliding plate 26 and top member 17, respectively, and is attached to saw guard 106 by pivoted link 108 to permit guard 106 to be moved upwardly to expose blade 25 of the saw. Guard 106 includes an inclined work engaging surface 110 to effect automatic displacement of the guard as the sliding plate moves toward a workpiece. As illustrated in both FIGS. 6 and 6A, the saw guard assembly is fixedly connected to sliding plate 26 by an L-shaped mounting bracket 103 and an intermediate plate 104. Note that L-shaped mounting bracket 103 includes elongated slots 103a and 103b which are adapted to permit vertical and horizontal adjustment of the guard assembly base 97 relative to plate 26. Intermediate plate 104 includes a pivot pin 104a positioned to extend through aperture 104b of base section 97a. Pin 104a is further positioned to be in alignment with the pivot axis about which standard saw 96 is adapted to be selectively rotated relative to standard saw base plate 80 in order to selectively position the plane defined by blade 25 at a slant with respect to vertical. This arrangement of pivot pin 104a permits base 97 of the saw guard assembly to be selectively rigidly connected with plate 26 regardless of the orientation of blade 25.

FIGS. 6B, 6C and 6D illustrate an alternative guard assembly mounting structure which eliminates the need for L-shaped bracket 103 and intermediate plate 104 by connecting the guard assembly to a downturned flange 99' on the rear portion of sliding plate 26. As illustrated in FIG. 6B, the sliding plate contains a transverse slot 101' adjacent flange 99'. A leg 103' of triangular guard assembly base 105' extends through slot 101' for connection with an L-shaped bracket 107' (illustrated only in FIGS. 6C and 6D) by threaded bolts 109'. A horizontally extending leg 111' of bracket 107' having a horizontally extending lip 113' is provided to support an extension leg 115' of U-shaped mounting bracket 100 which may be configured to be mounted on the handle of a standard hand-held circular saw instead of the saw guard as illustrated in FIG. 6. An arcuate slot 117' (FIG. 6B) is contained within downturned flange 99' to receive a wing nut fastener 119' (FIG. 6B) to fasten bracket 107' to flange 99' and to permit the guard assembly to pivot about the pivot axis defined by the conventional pivot connection between the hand-held circular saw and the saw base plate actually mounted to slide plate 26. In other words the slot 117' is positioned in flange 99' such that the arc center is in alignment with the pivot connection between the circular saw and its base. Transverse slot 101' is configured to permit the necessary freedom of movement of leg 103' as triangular guard assembly base 105' is pivoted about the axis defined by slot 117'.

Figure 7:
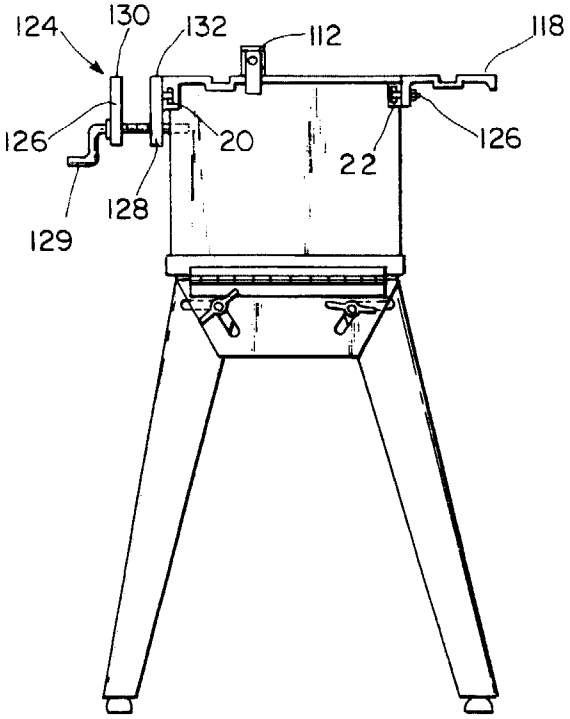
FIG. 7 is a front elevational view of the folding bench of FIG. 2, including various types of auxiliary attachments which may be employed with the subject invention in order to increase its utility.
Figures 8, 8A:
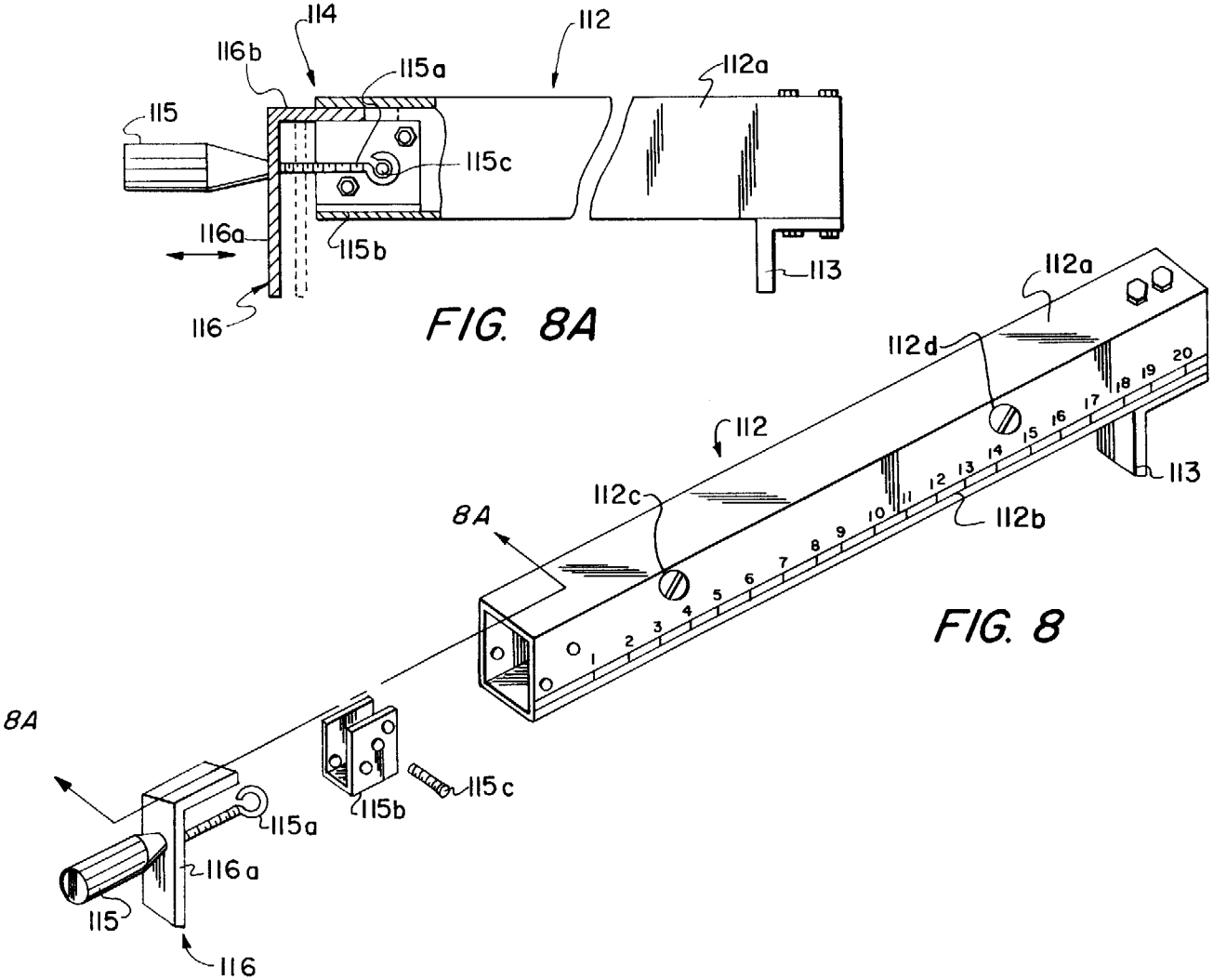
FIG. 8 is an exploded perspective view of a rip saw guide to be used in conjunction with a foldable bench in accordance with the subject invention as illustrated in FIG. 7.
FIG. 8A is a broken side elevational and partial cross sectional view taken along lines 8A—8A of the rip saw guide illustrated in FIG. 8.

FIG. 7 discloses a foldable bench of the subject invention combined with auxiliary attachments designed to expand the utility of the foldable bench. In particular, a rip saw guide 112 is illustrated as being mounted on the upper surface of top member 17. Grooves 86 illustrated in FIG. 5 are employed to assist in the alignment of the guide 112 in a parallel position with regard to the plane defined by the blade of the saw mounted on sliding plate 26. FIGS. 8 and 8A illustrate guide 112 in more detail which may be formed of a hollow aluminum channel 112a having a square cross section to which L-shaped bracket 113 is connected at one end. A clamp assembly 114 is attached to the other end of guide 112 including screw handle 115 threadedly connected to threaded eye bolt 115a which in turn is connected to a U-shaped bracket 115b by pin 115c. Bracket 115b is attached to the inside of channel 112a such that the upper ends 115d of each leg of bracket 115b form a guide for one leg 116a of L-shaped bracket 116. Eye bolt 115a extends through the outer leg 116b of L-shaped bracket 116 such that the lower section of leg 116a can be used in conjunction with bracket 113 to form a vise like device for gripping the lateral edges of member 17 adjacent sidewalls 8 and 10. Saw guide 112 may also be provided with a scale 112b for quick and convenient measurement of workpieces and may even be provided with leveling vials 112c and 112d to permit the guide to be used as a level.

Figure 9:
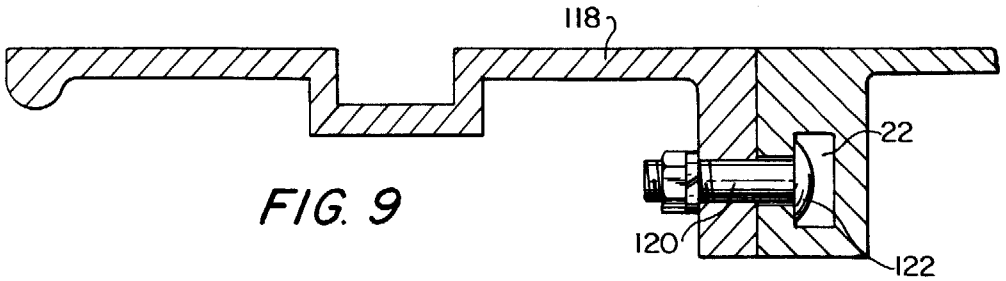
FIG. 9 is a cross-sectional view of a top member extension as illustrated in FIG. 7.

A top member extension 118 (illustrated in FIGS. 7 and 9) may be attached to one or both sides of top member 17 by means of fasteners 120 having heads 122 adapted to be slid into T-shaped groove 88 of the edge projections 20 (FIG. 7) or 22 (FIG. 9). It should be noted that this arrangement of a top surface extension does not require added leg members and does not render the bench unstable in view of the lateral outwardly positioned extremities of the leg member 32, 34, 36 and 38.

Another type of attachment having utility in combination with the subject foldable bench is a vise 124 having jaws 126 and 128 connected by threaded operator 129 as illustrated in FIG. 7. Jaw 128 is connected to a slot 20 by means of the same type of fasteners 120 as illustrated in FIG. 9. Note in particular that the top edges 130 and 132 of vise 124 are at the same level as the upper surface of top member 17 and can therefore serve the added purpoe of an upper surface extension such as top member extension 118.

The various advantageous features of the subject foldable bench can be employed in combination to obtain synergistic advantages or can be employed independently for the unique benefits attributable to each.

In operation, the subject foldable bench is capable of utilizing a standard hand held saw to perform all of the functions normally performed by a bench saw as well as many of the functions normally performed by a radial arm saw as is discussed with reference to the complex table saw design disclosed in U.S. Pat. No. 3,841,188. At the same time, the subject invention permits the economy of using a standard, hand held, circular power saw in a simplified foldable bench design of unusual compactness when folded and unusual stability when erected. Various types of materials may be used in the manufacture of the subject bench, but lightweight metals are preferred.

The disclosed foldable bench is illustrated in combination with numerous auxiliary attachments and features which are designed to maximize the utility of the subject saw design without markedly increasing its cost or complexity.

We claim:

1. A foldable bench for converting a normally hand held electrically [power] *powered* circular saw having a base plate into a table saw, comprising a. housing means for supporting a normally hand held electrically powered circular saw, said housing means including an upper surface for supporting material in a position to be cut by a normally hand held, electrically powered circular saw supported by said housing means, said housing means generally defining a parallelopiped having a first and second pair of opposed side walls, said first pair of opposed side walls having a greater horizontal dimension *than said second pair of opposed side walls;* b. retractable support means for supporting said housing means in a position above a floor level such that the said upper surface is easily accessible by an operator, said retractable supporting means including a plurality of foldable leg members having floor engaging extremities movable from a first position wherein said foldable leg members are contained entirely within said housing means to [the] *a* second position wherein said floor engaging extremities are positioned laterally beyond the lateral extremities of said upper surface; and c. stabilizer means for engaging the upper extremity of each leg member when in said second position in order to resist further outward lateral movement, said stabilizer means including four [clips] *fastening means* rigidly connected adjacent each of the lower lateral edges of said first opposed side walls *for releasibly holding said leg members in said second position*, whereby said foldable bench may be extremely compact when said foldable leg members are in said first position and extremely stable when said foldable leg members are in said second position.

2. A foldable bench as defined in claim 1, further including a first pair of said leg members adjacent one side wall of said first pair of opposed side walls, and a second pair of said leg members adjacent the other said side wall of said first pair of side walls and first and second hinge means for hingedly connecting one leg member from each of said first and second pairs of said leg members to said housing means to pivot about first and second axes parallel, respectively to said second pair of opposed side walls.

3. A foldable bench as defined in claim 2, wherein said first and second hinge means include first and second plate members, respectively, hingedly connected to the lower edge extremities of said second pair of opposed side walls, each said plate member including movable pivot means for constraining each of the associated pair of said leg members to pivot about an axes perpendicular to the plane defined by said plate member and permitting said respective leg member to be displaced from said first position wherein said associated pivot axis is at a maximum lateral position with respect to said plate member to an intermediate position wherein said pivot axis is displaced inwardly from the lateral edges of said plate member.

4. A foldable bench as defined in claim 3, wherein said pivot means includes first and second slots arranged to intersect, respectively, with first and second slots formed in said leg members associated with each said plate member, and further including a releasable fastener means extending through each intersecting pair of slots, respectively, for selectively retaining said leg members and said plate member in a fixed pre-determined orientation.

5. A foldable bench as defined in claim 3, wherein one leg member from each said pair of leg membes when in said intermediate position is spaced inwardly from the lateral edge of the associated said plate member by a lateral distance which exceeds the sum of the lateral width and the laterally inwardly-spaced intermediate position of the other said leg member of each said pair of leg members, whereby said leg members, when in said intermediate position, may be pivoted about said first and second axes parallel to said second pair of opposed side walls into said first position without intersecting one another.

6. A foldable bench as defined in claim 1, wherein each said leg member is formed of first and second intersecting perpendicular flat sides wherein one said flat side contains said leg member slot and wherein the other said flat side engages one of said clips.

7. A foldable bench as defined in claim 1, further including first and second foldable brace means extending between first and second pair of said leg members adjacent said first pair of opposed side walls, respectively, to prevent lateral movement when said leg members are in said second position.

8. A foldable bench as defined in claim 1, wherein said upper surface contains a longitudinally extending slot and further including a sliding plate to which the base of an electrically powered, circular saw may be removably mounted, and further including support means for mounting said sliding plate immediately beneath said upper surface to permit a circular saw blade to extend upwardly through the longitudinally extending slot as said plate is slidingly moved beneath said upper surface.

9. A foldable bench as defined in claim 8, wherein one side wall of said first pair of said side walls includes a laterally extending opening and wherein said sliding plate includes a pivoted handle which may be displaced from a first position in which said pivoted handle is contained entirely within said housing means to a second position in which said pivoted handle extends outwardly of said housing means through said laterally extending opening.

10. A foldable bench as defined in claim 9, wherein said housing means includes a pair of elongated grooves extending adjacent the upper edge of said first pair of opposed sides, each said groove being inwardly enlarged to receive a fastener head for connecting auxiliary attachments to said housing means.

11. A foldable bench as defined in claim 10, wherein said housing includes an extruded top member formed as a unitary member to include said upper surface, said support means and said grooves.

12. A foldable bench as defined in claim 8 further including a guard assembly mounted to said sliding plate and including a. a guard assembly base mounted to said sliding plate and extending above said sliding plate through said longitudinally extending slot, b. a circular saw guard movable between a first position fully enclosing that portion of a circular saw blade extending above the support surface to a second position exposing the circular saw blade for cutting, said circular saw guard including a workpiece engaging means for automatically displacing said circular saw guard from said first position toward said second position as the circular saw blade is moved into engagement with a workpiece, and c. a link member pivotally connected at one end to said guard assembly base and pivotally connected at the other end to said circular saw guard.

13. A foldable bench as defined in claim 12, wherein said guard assembly includes means for directly connecting said guard assembly base to said sliding plate.

14. A foldable bench as defined in claim 13 wherein said means for directly connecting said assembly bar to said sliding plate also includes means for directly connecting said guard base assembly to the electrically powered, circular saw mounted on said sliding plate.

15. A foldable bench as defined in claim 13 adapted for supporting an electrically powered circular saw selectively rotatable about an adjustable pivot axis relative to a standard base plate to place the circular saw at a desired acute angle with respect to the plane defined by the standard base plate, wherein said means for directly connecting said guard base to said sliding plate includes means for pivoting said guard assembly about the adjustable pivot axis of the electrically powered circular saw.

16. A foldable bench as defined in claim 11, further including a top member extension including a flat upper surface and fastener means for removably attaching said top member extension to said extruded top member such that said flat upper surface is in the same plane as said upper surface of said top member.

17. A foldable bench as defined in claim 11, further including a vise attachment having first and second jaw members selectively movable toward and away from one another, said vise attachment being positioned when connected to said top member such that the upper extremities of each said jaw members are in the plane defined by said upper surface of said top member.

18. A foldable bench member as defined by claim 11, further including a rip saw guide having adjustable vise means for selectively connecting said saw guide to said top member such that the longitudinal axis of said saw guide is parallel to said longitudinally extending slot.

19. A foldable bench as defined by claim 18, wherein said top member includes grooves parallel to said longitudinally extending slot for aligning said rip saw guide.

20. A foldable bench as defined in claim 18, wherein said rip saw guide includes a hollow elongated channel having a square cross-section, a U-shaped bracket having leg members shorter than the inside vertical height of said hollow elongated channel and adapted to be fixedly retained in one end of said hollow elongated channel, and an L-shaped bracket including one leg adapted to move rectilinearly between the ends off said legs of said U-shaped bracket and the inside surface of one side of said elongated hollow channel.

21. A foldable bench as defined in claim 18, wherein said rip saw guide includes means for indicating level and length information.

* * * * *